Figure 1A:
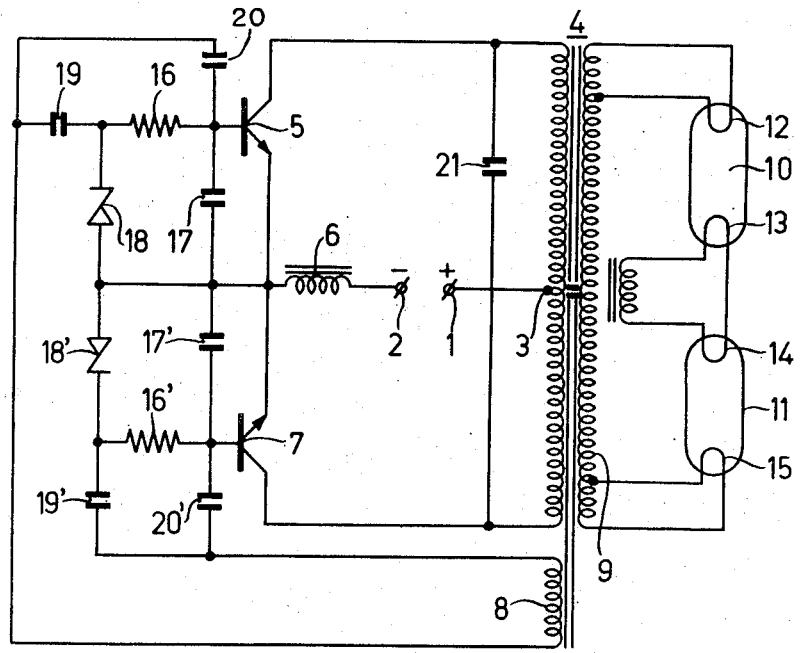

United States Patent [19]
Luursema et al.

[11] 3,818,312
[45] June 18, 1974

[54] DC-AC CONVERTER

[75] Inventors: Meerten Luursema; Hilbert Palmers; Dan Bernardus Wijsboom, all of Emmasingel, Eindhoven, Netherlands

[73] Assignee: U.S. Philips Corporation, New York, N.Y.

[22] Filed: Sept. 11, 1972

[21] Appl. No.: 288,150

[30] Foreign Application Priority Data
Sept. 17, 1971 Netherlands ..................... 7112766

[52] U.S. Cl. ................ 321/44, 315/219, 315/227 R
[51] Int. Cl. ... H02m 1/02, H02m 7/52, H05b 41/24
[58] Field of Search ........... 315/209 R, 219, 227 R, 315/DIG. 2, DIG. 5; 321/2, 44, 45 R

[56] References Cited
UNITED STATES PATENTS
2,972,710  2/1961  D'Amico ......................... 321/2 UX
3,573,544  4/1971  Zonis et al. ..................... 315/219 X
3,662,249  5/1972  Wijsboom ....................... 321/45 R
3,663,944  5/1972  Low et al. ....................... 321/45 R Primary Examiner—A. D. Pellinen
Attorney, Agent, or Firm—Frank R. Trifari; Bernard Franzblau

[57] ABSTRACT

A DC-AC converter includes a transformer with its primary winding in series with a transistor across the terminals of a DC voltage source. A resistor is connected between the emitter and base of the transistor and a coupling capacitor connects a coupling winding of the transformer to the base of the transistor. An auxiliary DC voltage source is included in the connection between the emitter and the resistor so that the converter is less sensitive to variations in the DC source voltage.

13 Claims, 5 Drawing Figures

DC-AC CONVERTER

The invention relates to a dc-ac converter provided with at least one transistor whose emitter is connected to the base through at least a resistor, and further provided with a transformer which has a primary winding, a coupling winding and a secondary winding, at least part of the primary winding forming part of the main electrode circuit of the transistor arranged across two input terminals of the converter, a coupling capacitor being connected between the coupling winding of the transformer at one end and the connection between the resistor and the base of the transistor at the other end.

A known dc-ac converter of the kind mentioned above is described for example, in French Pat. No. 1,230,993. Such a converter may be used, for example, for supplying discharge lamps in vehicles. A drawback of the known converter is that its operation is rather strongly influenced by a variation of the value of the direct voltage applied to the input terminals. A variation of this direct voltage leads inter alia to a variation of the voltage across the resistor in the base circuit of the transistor and this in turn leads to both a different drive of the transistor and other losses in the control circuit of the transistor.

In a converter which is loaded by a discharge lamp the problem occurs that in case of an increase of the direct supply voltage the power consumed by the lamp percentually increases substantially as much as does the direct voltage supply. This means that the current in the primary circuit of the converter remains constant. This can only be satisfactorily realized when the base drive of the transistor remains the same. When this is not the case, it is a drawback due to the said losses then occurring. Also for some loads other than the said discharge lamps, the same problems may occur.

An object of the invention is to obviate or at least mitigate the said drawback.

According to the invention a dc-ac converter provided with at least one transistor whose emitter is connected to the base through at least a resistor and further provided with a transformer which has a primary winding, a coupling winding and a secondary winding in which at least part of the primary winding forms part of the main electrode circuit of the transistor arranged across two input terminals of the converter and in which a coupling capacitor is connected between the coupling winding of the transformer at one end and the connection between the resistor and the base of the transistor at the other end, is characterized in that the connection between the emitter and the resistor includes an auxiliary direct voltage source which has a polarity which would render the transistor conducting when the resistor was short-circuited.

An advantage of a converter according to the invention is that the operation of the converter is less dependent on variations in the supply voltage. The voltage across the resistor in the base circuit of the transistor does not increase or decrease to the same strong extent with the battery voltage. In fact, the voltage across this resistor is mainly prescribed by the auxiliary direct voltage source. Since the last-mentioned source need not supply a main current but only a drive current, unwanted voltage variations thereof can be more easily prevented than in the battery providing the main current. As a result the voltage across the resistor in the base circuit and hence the base current etc. can be better controlled.

The following may be noted to explain the foregoing. During the non-conducting state of the transistor a current will generally flow through the base resistor. Prior to the invention the voltage across this resistor and consequently also the current flowing through this resistor was dependent to a large extent on the direct voltage supply (the battery voltage). Due to the introduction of the auxiliary direct voltage source the ratio between the voltages across the base resistor is reduced (in case of a variation of the battery voltage) and this because with this ratio the voltage of the auxiliary direct voltage source appears both in the numerator and in the denominator. For further details reference is made to the description of the Figures.

The auxiliary direct voltage source may be, for example, an ordinary dry cell.

The auxiliary direct voltage source in a converter according to the invention preferably consists of a Zener diode in which a second capacitor is incorporated between the junction of the coupling capacitor and the coupling winding at one end and the junction between the Zener diode and the resistor at the other end so that a voltage in the cut-off direction is realized by the second capacitor on the Zener diode.

An advantage of this preferred embodiment is that a satisfactory constant value of the auxiliary direct voltage (Zener voltage) is obtained in a simple manner, at least during the important time intervals when the transistor does not conduct.

In a further preferred embodiment of the converter in which the secondary winding of the transformer is coupled to a load, particularly to a stabilised discharge lamp, and in which the main electrode circuit of the transistor includes an inductor, the auxiliary direct voltage source consists of a third capacitor which is incorporated in a charge circuit of which also a second resistor and a rectifier diode form part, which charge circuit constitutes a closed circuit with at least part of the inductor.

An advantage of this preferred embodiment is that since the said inductor is often present anyway in converters, namely to enhance switching of the transistor of the loaded converter — independent of variations in the battery voltage — the advantage of the invention can be obtained in many cases by the mere addition of a capacitor and a simple charge circuit.

A further advantage of the last-mentioned preferred embodiment is that in case of an increase of the battery voltage the voltage of the auxiliary direct voltage source decreases. Such an embodiment creates the possibility of maintaining the current through the base resistor more constant — in case of a variation of the battery voltage — than in the case of a constant auxiliary direct voltage. It is achieved thereby that the ratio between the conducting period of the transistor and the period when the transistor does not conduct can even better be maintained within given limits.

In a converter according to the last-mentioned preferred embodiment this can be realized because it has been found that the current intensity through the inductor just before one of the transistors has become non-conducting is smaller at a high battery voltage than at a low battery voltage. The third capacitor is therefore charged to a lesser extent at a high battery voltage than at a low battery voltage after the transistor has become non-conducting.

In a further preferred embodiment, the converter is formed with two transistors as a push-pull converter with at least one of the resistors connected to a base of one of the two transistors being a variable resistor.

This has the advantage that by adjusting said resistor the accurate selection of transistors suited to each other can be omitted.

Figures 1B, 1C:
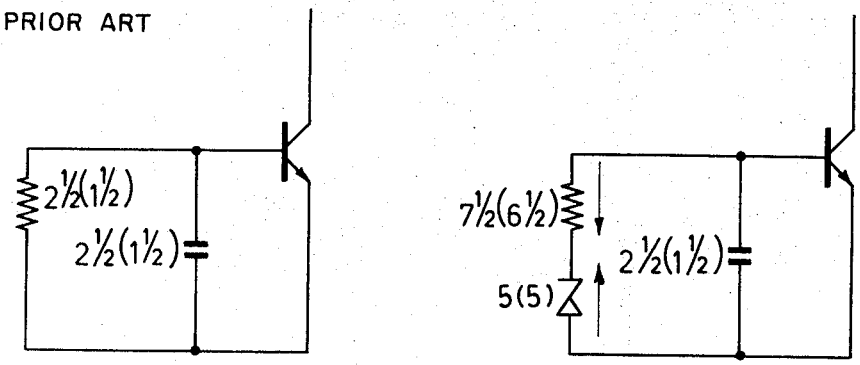
Figure 2:
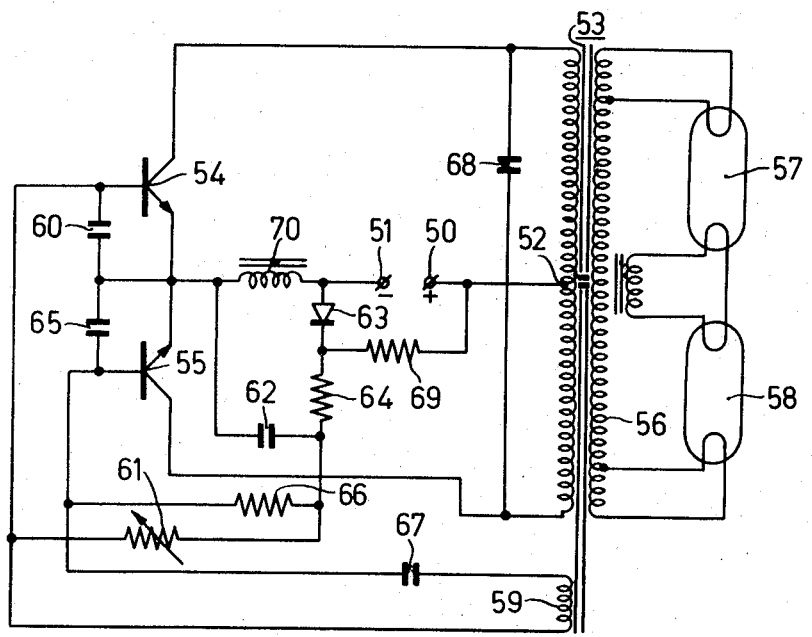
Figure 3:
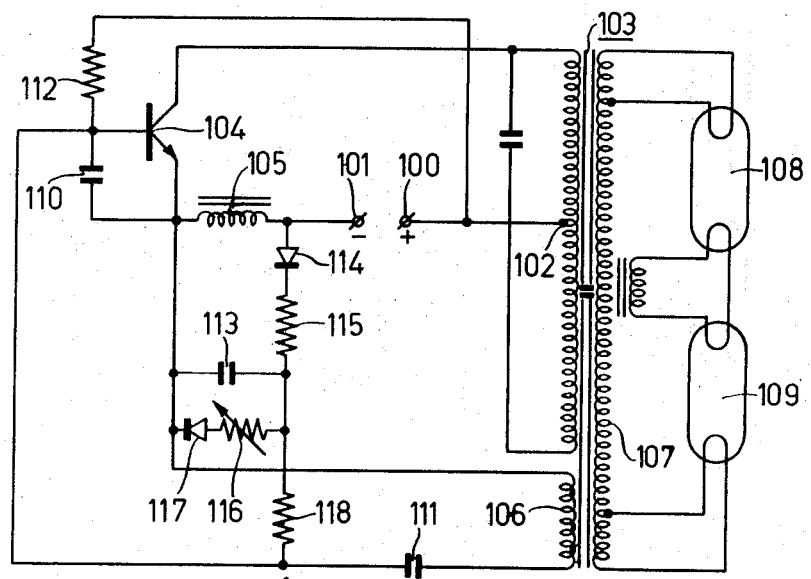

The invention will be further described with reference to the accompanying drawing in which:

FIG. 1a shows an electrical circuit diagram of a first embodiment of a dc-ac converter according to the invention, FIG. 1b shows a detail of the base circuit of a transistor prior to the invention, FIG. 1c shows the same detail as described in FIG. 1b, however, after the invention, FIG. 2 shows an electrical circuit diagram of a second embodiment of a converter according to the invention, and FIG. 3 shows an electrical circuit diagram of a third embodiment of a converter according to the invention.

In FIG. 1a input terminals 1 and 2 are intended to be connected to a direct voltage source. Terminal 1 is connected to the centre 3 of the primary winding of a leakage transformer 4. One end of this primary winding is connected to the collector of a transistor 5. This is a transistor of the npn type. The emitter of transistor 5 is connected through an auxiliary coil 6 to the negative terminal 2 of the converter. The other end of the primary winding of transformer 4 is connected through a transistor 7 to the auxiliary coil (auxiliary inductor) 6. The transformer also includes a coupling winding 8 and a secondary winding 9. A series arrangement of two low-pressure mercury vapour discharge lamps 10 and 11 is connected to the secondary winding 9 of the transformer 4. These lamps are stabilised by the leakage character of the transformer 4. The electrodes 12 – 15 of the lamps are connected through separate windings of the transformer. The control circuit of the transistor 5 includes a resistor 16. Furthermore, a capacitor 17 is arranged between the base and the emitter of transistor 5. The side of resistor 16 remote from the base is connected to a Zener diode 18, the other side of which is connected to the auxiliary inductor 6. The junction between resistor 16 and the Zener diode 18 is connected through a capacitor 19 to the coupling winding 8 of the transformer 4. Corresponding circuit elements are denoted by the same reference numerals in the control circuit of the transistor 7 on the understanding that they are provided with indices. An additional capacitor 20, namely a coupling capacitor is connected between the coupling winding 8 of transformer 4 and the base of transistor. Similarly, a coupling capacitor 20' is connected between the other end of winding 8 and the base of transistor 7 to maintain the circuit symmetry. A required starter is not shown in FIG. 1a.

Transistors 5 and 7 become alternately conducting so that an oscillation is maintained in the primary winding of the transformer and the capacitor 21 shunting this transformer. This oscillation is passed on to the load (the lamps 10 and 11) and to the coupling winding 8. This coupling winding also contributes to the control of the transistors.

In one embodiment the voltage of the direct voltage source across the terminals 1, 2 was 60 Volts at a minimum and 100 Volts at a maximum. The two lamps 10 and 11 were lamps of 20 W. The resistors 16 and 16' had a value of approximately 50 Ohms. Capacitors 17 and 17' had a value of approximately 0.68 μF. Capacitors 19 and 19' had a value of approximately 0.068 μF. Capacitors 20 and 20' had a capacitance of approximately 0.033 μF. Coil 6 had an inductance of approximately 0.18 m Henry. The Zener diodes 18 and 18' had a cutoff voltage of 5 Volts each. the frequency of the converter was approximately 20 kHz. In this embodiment this would lead to a variation of the voltage across the resistor 16 from approximately 1½ Volts to approximately 2½ Volts for the given variation of the direct voltage across the terminals 1, 2 in the absence of the auxiliary direct voltage source (constituted by the combination of Zener diode 18 with the charge circuit through the capacitor 19, i.e., a situation in which 16 would be directly arranged across the capacitor 17). In the case of FIG. 1a, hence in the converter according to the invention, the voltage variation across resistor 16 is relatively low because it varies from only 6.5 Volts to 7.5 Volts in the case of an equally large variation of the voltage across the terminals 1, 2.

In FIGS. 1b (prior to the invention) and 1c (after the invention) these data are further illustrated. The transistor shown is transistor 5 of FIG. 1a and the capacitor is capacitor 17 of FIG. 1a. In FIG. 1c the resistor and the Zener diode are the resistor 16 and the Zener diode 18 of FIG. 1a. In FIGS. 1b and 1c the numbers placed outside the brackets are the voltages (in Volts) across the different circuit elements where the battery voltage was 100 Volts, and the numbers placed between brackets are the corresponding voltages at a battery voltage of 60 Volts. The arrows in FIG. 1c relate to the voltage direction.

All this leads to the fact that both the losses in the control circuit of the transistor 5 and the drive of this transistor 5 are less influenced by direct voltage variations across the terminals 1 and 2 than was the case prior to the invention. This also applies, of course, to the case of transistor 7.

Likewise as in FIG. 1a, FIG. 2 shows a push-pull converter which is formed with two transistors.

In FIG. 2 input terminals 50 and 51 of the converter are intended to be connected to direct voltage source. Terminal 50 is connected to the centre tap 52 of the primary winding of a leakage transformer 53. One end of this primary winding is connected to the collector of a transistor 54 while the emitter of the transistor 54 is connected through an auxiliary inductor 70 to the negative input terminal 51. The other side of the primary winding of transformer 53 is connected through the collector of a transistor 55 and the emitter of this transistor to the said auxiliary inductor 70. The load on the secondary side 56 of the transformer 53 is substantially the same as that in the case of FIG. 1a. The two lamps are denoted by 57 and 58 in FIG. 2. A coupling winding of transformer 53 is denoted by 59. A capacitor 60 is arranged between the base and the emitter of transistor 54. The base of transistor 54 is furthermore connected to a variable resistor 61. The other side of this variable resistor 61 is connected to a capacitor 62. Furthermore, capacitor 62 is connected to a charge circuit consisting of diode 63 and resistor 64, which are arranged in series, and inductor 70. To this end these circuit elements constitute, together with capacitor 62, a closed circuit.

The base-emitter junction of transistor 55 is furthermore shunted by a capacitor 65 which has the same value as capacitor 60. The base side of capacitor 65 is connected to a fixed resistor 66. The other side of resistor 66 is connected to a junction between the variable resistor 61 and capacitor 62. A coupling capacitor 67 is arranged between the coupling winding 59 of the transformer 53 and the base of transistor 55. A capacitor 68 shunts the primary winding of transformer 53. A starter resistor is denoted by 69.

In FIG. 2 transistors 54 and 55 are alternately rendered conducting. When one of these transistors becomes non-conducting the current which then flows through the positive terminal and part of the primary winding across this transistor and the auxiliary inductor 70 to the negative supply terminal 51 will attempt to be maintained. This is effected by a current which flows through the diode 63, the resistor 64 and the capacitor 62. As a result the capacitor 62 is charged. The capacitor 62 serves as an auxiliary direct voltage source to which the base resistors 66 and 61 are connected. Similar to the converter of FIG. 1a, this auxiliary direct voltage source serves to prevent a variation in the magnitude of the direct voltage between the terminals 50 and 51 from having a strong influence on the direct voltage across the base resistors 61 and 66. Due to the action of this auxiliary direct voltage source 62 such an influence is greatly reduced.

An additional advantage of the circuit of FIG. 2 is the following. In the case of a large voltage across the terminals 50, 51 the current at the end of a conducting period of transistor 54 is found to be rather low so that the capacitor 62 is charged to a slight extent in those cases. Conversely, a low voltage across terminals 50, 51 results in a high voltage on capacitor 62. Consequently, the control of the transistors is still less influenced than in the case of an auxiliary direct voltage source of constant value.

The resistor 61 is variable which has the advantage that a selection of transistors 54 and 55, which are not quite suited to each other, need not be made. This is because possible differences between these transistors can be realized by recontrolling the resistor 61. The alternate conductance of transistors 54 and 55 results in an alternating voltage in the transformer windings so that the lamps 57 and 58 operate at alternating current.

Finally, FIG. 3 shows an electrical circuit diagram of a converter single-ended according to the invention. This is a converter which is provided with the same auxiliary direct voltage source as shown in FIG. 2. However, this converter is not a push-pull converter but a single transistor converter. Input terminals 100 and 101 are intended to be connected to a direct voltage source. Terminal 100 is the positive terminal. It is connected to the centre tap 102 of a primary winding of a leakage transformer 103. One end of the primary winding of transformer 103 is connected to a collector of a transistor 104. The emitter of the transistor 104 is connected through an auxiliary inductor 105 to the negative supply terminal 101. The transformer includes a coupling winding 106 and a secondary winding 107 to which, as in the converters of FIGS. 1a and 2, a series arrangement of two low-pressure mercury vapour discharge lamps 108 and 109 is connected. Here again the connection between the base and the emitter of transistor 104 is provided with a capacitor 110. The base of transistor 104 is also connected through a coupling capacitor 111 to the coupling winding 106 of transformer 103. A starter resistor 112 is connected between the base of transistor 104 and the input terminal 100. A capacitor, which corresponds to capacitor 62 of FIG. 2, is denoted by 113. Furthermore diode 114 and resistor 115 correspond to diode 63 and resistor 64 of FIG. 2. An adjusting resistor 116 which in series with a diode 117, shunts capacitor 113. A base resistor 118 is connected between capacitor 113 and the base of transistor 104.

The operation of this circuit and the advantages achieved therein by the introduction of the auxiliary direct voltage source, which consists of capacitor 113 charged through the charge circuit 105, 114, 115, is substantially the same as that in FIG. 2. Here again the current through the inductor 105 at the end of the conducting period of the transistor 104 is a measure determining the voltage across capacitor 113 and hence maintains the control of transistor 104 substantially constant.

What is claimed is:

1. A dc-ac converter comprising a pair of input terminals adapted for connection to a source of voltage, a resistor, a transistor having an emitter, base and collector, means connecting the transistor emitter through the resistor to its base, a transformer having a primary winding, a coupling winding and a secondary winding, means connecting at least part of the primary winding as a part of the emitter-collector circuit of the transistor arranged across said input terminals of the converter, a coupling capacitor connected between the coupling winding of the transformer and the connection between the resistor and the base of the transistor, an auxiliary direct voltage source included in the connection between the emitter of the transistor and the resistor, said auxiliary direct voltage source having a polarity which tends to make the transistor conduct, and means connecting the secondary winding to a load.

2. A dc-ac converter as claimed in claim 1, wherein the auxiliary direct voltage source comprises a Zener diode connected between the emitter of the transistor and the resistor and a second capacitor connected between the junction of the coupling capacitor and the coupling winding at one end and the junction between the Zener diode and the resistor at the other end so that a voltage in the cut-off direction is realized on the Zener diode via a current flowing through the second capacitor.

3. A dc-ac converter as claimed in claim 1 wherein the load includes a stabilised electric discharge lamp, an inductor connected in the emitter-collector circuit of the transistor, and the auxiliary direct voltage source comprises a third capacitor which is included in a charge circuit which also includes a second resistor and a diode, and means connecting said charge circuit in a closed circuit with at least a part of the inductor.

4. A dc-ac converter as claimed in claim 1 further comprising a second transistor connected in a push-pull circuit configuration with the first transistor and the primary winding across said input terminals, a second resistor connected between the emitter and base of the second transistor, and means connecting said auxiliary direct voltage source between the emitter of the second transistor and the second resistor with a polarity that tends to make the second transistor conduct.

5. A dc-ac converter as claimed in claim 4 further comprising a second coupling capacitor connected between the coupling winding and the connection between the second resistor and the base of the second transistor, and wherein said auxiliary direct voltage source comprises, first and second zener diodes connected between the emitter electrodes of said first and second transistors and said first and second resistors, respectively, and third and fourth capacitors connected between their respective junctions of the coupling capacitor and the coupling winding and the junctions between the respective zener diodes and their respective resistors.

6. A dc-ac converter as claimed in claim 4 further comprising an inductor connected in series with the emitter-collector paths of said first and second transistors across said input terminals, and wherein said auxiliary direct voltage source comprises, a diode, a third resistor and a second capacitor serially connected across at least a part of the inductor to form a closed loop circuit therewith.

7. A dc-ac converter comprising a pair of input terminals adapted to be connected to a source of DC voltage, a transistor, a transformer having a primary winding, a coupling winding and a secondary winding, means connecting at least a part of said primary winding in series with the transistor across said input terminals, a coupling capacitor connected between said coupling winding and the base of the transistor, a resistor connected between the emitter and base of the transistor so as to lie outside of the main DC current path of the transistor, an auxiliary DC voltage source connected in series with the resistor between the emitter and base of the transistor and with a polarity that tends to make the transistor conduct, and means connecting the secondary winding to a load.

8. A dc-ac converter as claimed in claim 7 further comprising a first capacitor connected in shunt with the series arrangement of the resistor and auxiliary DC voltage source across the emitter and base electrodes of the transistor.

9. A dc-ac converter as claimed in claim 7 wherein the auxiliary DC voltage source includes a constant voltage reference element in series with said resistor and a capacitor connected between the coupling winding and the junction between the reference element and the resistor.

10. A dc-ac converter as claimed in claim 7 further comprising an inductor connected in series with the transistor across said input terminals, and wherein said auxiliary DC voltage source comprises, a diode, a second resistor, a capacitor, and means serially connecting said diode, said second resistor and said capacitor across at least a part of the inductor to form a closed loop circuit therewith.

11. A dc-ac converter as claimed in claim 7 further comprising a second transistor connected in a push-pull circuit configuration with the first transistor and the primary winding across said input terminals, a second resistor connected between the emitter and base of the second transistor, and means connecting said auxiliary direct voltage source in series with the second resistor between the emitter and base of the second transistor and with a polarity that tends to make the second transistor conduct.

12. A dc-ac converter as claimed in claim 11 further comprising a first capacitor connected between the base and emitter of the first transistor and in series with the coupling capacitor between said coupling winding and said emitter, a second coupling capacitor connected between the coupling winding and the base of the second transistor, and a second capacitor connected between the base and emitter of the second transistor and in series with the second coupling capacitor between said coupling winding and said emitter of the second transistor.

13. A dc-ac converter as claimed in claim 11 further comprising an inductor connected in series with said first and second transistors across said input terminals, and wherein said auxiliary DC voltage source comprises, a diode, a third resistor, a capacitor, and means serially connecting said diode, said third resistor and said capacitor across at least a part of the inductor to form a closed loop circuit therewith.

* * * * *